United States Patent
Koller

(10) Patent No.: US 10,873,112 B2
(45) Date of Patent: Dec. 22, 2020

(54) BATTERY SYSTEM, VEHICLE WITH SUCH A BATTERY SYSTEM, AND METHOD FOR OPERATION OF SUCH A BATTERY SYSTEM

(71) Applicant: Robert Bosch GmbH, Stuttgart (DE)

(72) Inventor: Torsten Koller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 16/142,413

(22) Filed: Sep. 26, 2018

(65) Prior Publication Data

US 2019/0109350 A1    Apr. 11, 2019

(30) Foreign Application Priority Data

Sep. 26, 2017  (DE) .................. 10 2017 217 030

(51) Int. Cl.
*H01M 10/613* (2014.01)
*H01M 10/625* (2014.01)
(Continued)

(52) U.S. Cl.
CPC ....... *H01M 10/625* (2015.04); *H01M 2/1077* (2013.01); *H01M 10/0525* (2013.01);
(Continued)

(58) Field of Classification Search
CPC .......................... H01M 10/613; H01M 10/625
See application file for complete search history.

(56) References Cited

U.S. PATENT DOCUMENTS

| | | | | |
|---|---|---|---|---|
| 2010/0006044 | A1* | 1/2010 | Duley ....................... | F01P 5/12 123/41.02 |
| 2010/0055553 | A1 | 3/2010 | Kimura | |
| 2016/0093929 | A1* | 3/2016 | Obasih ................ | H01M 10/625 429/120 |

FOREIGN PATENT DOCUMENTS

| | | |
|---|---|---|
| DE | 102011077540 A1 | 12/2012 |
| DE | 112012002441 T5 | 4/2014 |
| DE | 102014015271 A1 | 4/2016 |

\* cited by examiner

*Primary Examiner* — Olatunji A Godo
(74) *Attorney, Agent, or Firm* — Michael Best & Friedrich LLP

(57) ABSTRACT

The invention relates to a battery system with a battery module (2) comprising a plurality of battery cells (3), wherein the battery cells (3) take the form, in particular, of lithium-ion battery cells or lithium-polymer battery cells, wherein the battery system (1) exhibits a first temperature-control-fluid guide (4) which is designed to be capable of being flowed through by a first temperature-control fluid (5) and, moreover, exhibits a first conveying unit (6) designed for a conveyance of the first temperature-control fluid (5) through the first temperature-control-fluid guide (4), and wherein the first temperature-control-fluid guide (4) is connected to the battery module (2) in heat-conducting manner, wherein the battery system (1) exhibits a second temperature-control-fluid guide (7) which is designed to be capable of being flowed through by a second temperature-control fluid (8) and, moreover, exhibits a second conveying unit (9) designed for an uptake of kinetic energy from the second temperature-control fluid (8), wherein the second temperature-control-fluid guide (7) exhibits at least one port (10) designed for a fluid-conducting connection to a further temperature-control-fluid guide (11), wherein the battery system (1) exhibits, moreover, a heat-exchanger unit (12) designed to the first temperature-control-fluid guide (4) and to the second temperature-control-fluid guide (7) in heat-conducting manner, which is designed to transfer heat between the first temperature-control-fluid guide (4) and the second temperature-control-fluid guide (7), wherein the first conveying element (6) and the second conveying element (9) are connected to one another in coupled manner in such a way that mechanical work can be transferred from the second conveying element (9) to the first conveying element (6).

15 Claims, 1 Drawing Sheet

(51) Int. Cl.
*H01M 10/0525* (2010.01)
*H01M 2/10* (2006.01)
*H01M 10/6568* (2014.01)

(52) U.S. Cl.
CPC ..... *H01M 10/613* (2015.04); *H01M 10/6568* (2015.04); *H01M 2220/20* (2013.01)

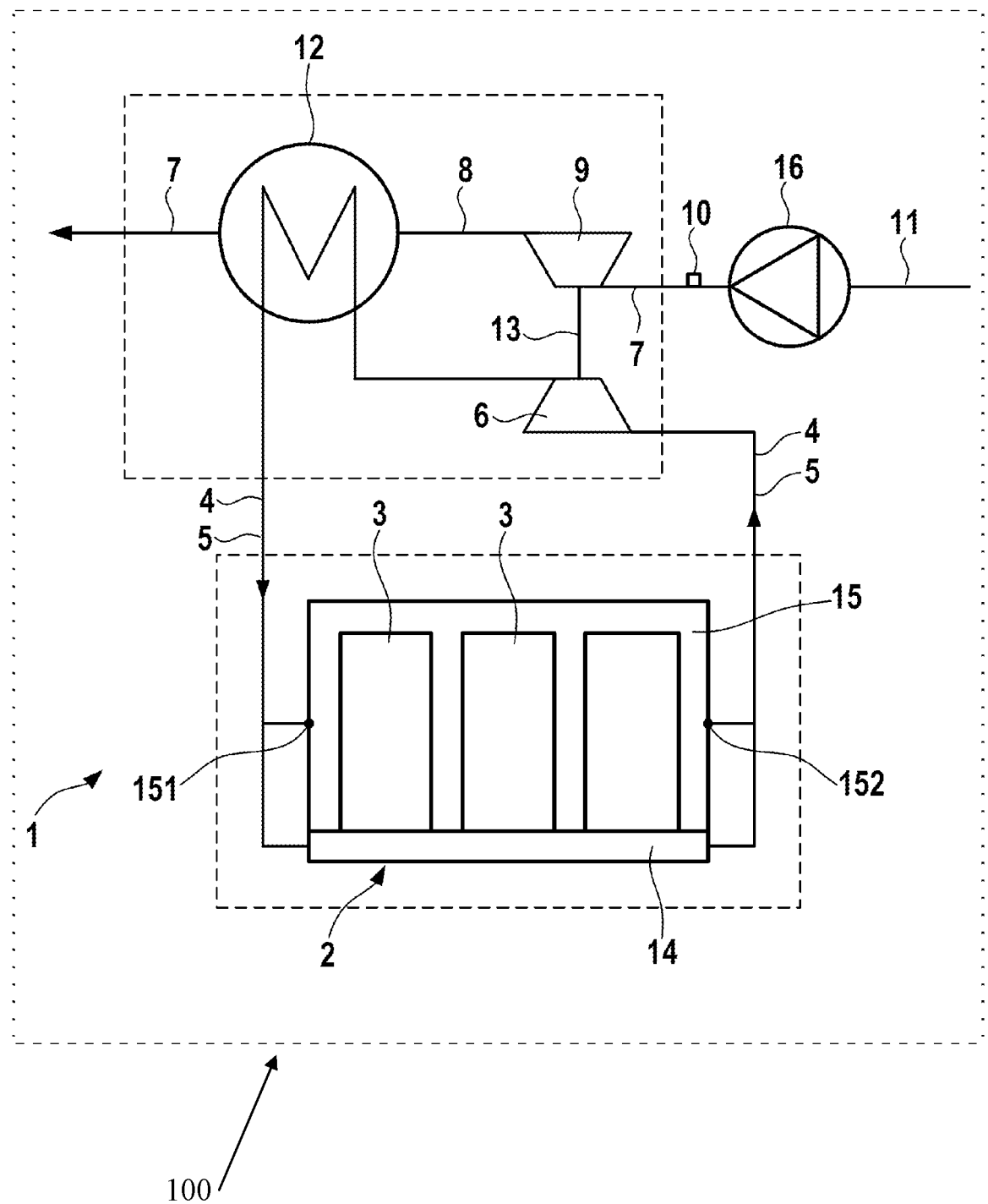

BATTERY SYSTEM, VEHICLE WITH SUCH A BATTERY SYSTEM, AND METHOD FOR OPERATION OF SUCH A BATTERY SYSTEM

BACKGROUND OF THE INVENTION

The invention takes as its starting-point a battery system.

Furthermore, the invention also relates to a vehicle including such a battery system.

Also a subject of the present invention is a method for operating such a battery system.

It is known from the state of the art that battery modules may consist of a plurality of individual battery cells which may have been interconnected in series and/or in parallel in electrically conducting manner.

Particularly in the case of electrically-operated vehicles (EV), hybrid electric vehicles (HEV) or plug-in hybrid electric vehicles (PHEV), high-energy and high-powered battery modules comprising lithium-ion battery cells or lithium-polymer battery cells, which preferably exhibit around a hundred battery cells, are employed, in order to be able to satisfy heightened expectations in terms of performance.

By reason of chemical conversion processes, the lithium-ion battery cells or lithium-polymer battery cells heat up, particularly in the course of the emission or uptake of electrical energy, so that for the purpose of operating such high-performance battery cells within a preferred temperature range it is known, moreover, that battery modules may include a temperature-control system which, in particular, is intended to ensure that the battery cells do not exceed a specified temperature.

In this connection it is to be noted that the preferred temperature range of lithium-ion battery cells lies approximately between 5° C. and 35° C. Moreover, the service life steadily declines as from an operating temperature of approximately 40° C., as a result of which the battery cells are to be kept in a thermally uncritical state below 40° C. by means of the temperature-control system, for the purpose of satisfying the requirements as regards an adequate service life.

In addition, the temperature gradient between the various battery cells should not exceed 5 K.

For this purpose, temperature-control systems utilizing, for instance, liquids—such as water/glycol mixtures for instance,—flowing through cooling plates are known from the state of the art.

Moreover, from the state of the art it is known to arrange a thermal compensating layer, designated as "thermal interface material" (TIM), between such cooling plates and the battery cells of the battery module.

If, on the other hand, the battery cells exceed a specified safety-critical temperature, this can lead to a thermal runaway of the battery cell and to a possibly associated propagation, resulting in considerable safety risks.

SUMMARY OF THE INVENTION

A battery system according to the invention offers the advantage that a temperature control of a battery module having a plurality of battery cells can be made available which, moreover, can be connected in straightforward manner and independently to a further temperature-control system such as, for instance, a temperature-control system of a vehicle.

In addition, a battery system according to the invention offers the advantage that a temperature control is also possible by means of a circulation of temperature-control fluid, without an additional actively driven conveying element within the battery system.

For this purpose, a battery system is made available which, in particular, is a battery system of a vehicle.

The battery system in this case includes a battery module with a plurality of battery cells which, in particular, take the form of lithium-ion battery cells or lithium-polymer battery cells.

The battery system in this case exhibits a first temperature-control-fluid guide.

The first temperature-control-fluid guide is designed for a through-flow by a first temperature-control fluid.

Moreover, the first temperature-control-fluid guide exhibits a first conveying unit which is designed to convey the first temperature-control fluid through the first temperature-control-fluid guide.

The first temperature-control-fluid guide is connected to the battery module in heat-conducting manner.

The battery system exhibits a second temperature-control-fluid guide.

The second temperature-control-fluid guide is designed for a through-flow by a second temperature-control fluid.

Moreover, the second temperature-control-fluid guide exhibits a second conveying unit which is designed to take up kinetic energy from the second temperature-control fluid which, in particular, is flowing through the second temperature-control-fluid guide.

The second temperature-control-fluid guide exhibits at least one port which is designed to be connected to a further temperature-control-fluid guide in fluid-conducting manner.

In addition, the battery system includes a heat-exchanger unit which is designed connected to the first temperature-control-fluid guide and to the second temperature-control-fluid guide in heat-conducting manner and furthermore is designed to transfer heat between the first temperature-control-fluid guide and the second temperature-control-fluid guide.

The first conveying element and the second conveying element are connected to one another in coupled manner in such a way that the second conveying element can transfer mechanical work to the first conveying element.

It is an advantage if a first temperature-control fluid is received in the first temperature-control-fluid guide.

In this case, the first temperature-control fluid may take the form of a water/glycol mixture or a dielectric temperature-control fluid.

A dielectric fluid at this point is an electrically non-conducting fluid.

In particular in this case, the first temperature-control fluid is different from the second temperature-control fluid.

The first temperature-control-fluid guide may also, for instance, be designated in other words as an internal temperature-control circuit of the battery module.

Consequently, the first temperature-control fluid—which, for instance, takes the form of a water/glycol mixture or a dielectric temperature-control fluid—may also be designated as an internal temperature-control fluid of the battery module.

As a result, it is possible that a battery system according to the invention can be connected to a further temperature-control-fluid guide without utilizing the temperature-control fluid utilized by the further temperature-control-fluid guide for the immediate, direct temperature control of the battery module.

For instance, as a result, with a battery system according to the invention it is, moreover, possible to select the first temperature-control fluid—and consequently the design of the immediate, direct temperature control of the battery module—independently of the specifications of vehicle manufacturers or of the requirements of a further temperature-control-fluid guide.

Consequently, a battery module can be designed very largely independently of respective temperature-control-system elements existing in a vehicle, such as, for instance, pumps and hoses.

A battery system according to the invention consequently constitutes a compact unit which can be attached by means of the at least one port to the further temperature-control-fluid guide, for instance of a vehicle, and consequently can be integrated into a vehicle in straightforward manner.

It is expedient if the battery module includes a temperature-control plate connected to the plurality of battery cells in heat-conducting manner.

In this case, the temperature-control plate is designed to be capable of being flowed through by the first temperature-control fluid.

As a result, it is possible to design a reliable temperature control of the plurality of battery cells by means of a temperature-control plate capable of being flowed through by the first temperature-control fluid.

For this purpose, the temperature-control plate may, for instance, include a plurality of flow channels.

It is particularly expedient if the battery module includes an interior space.

In this case, the plurality of battery cells are accommodated in the interior space.

Moreover, the interior space is designed to be capable of being flowed through by the first temperature-control fluid.

In this case, it is preferred if the plurality of battery cells are arranged in such a way that they are capable of being flowed around immediately by the first temperature-control fluid.

For this purpose, the interior space may, for instance, have been sealed in fluid-tight manner in relation to an environment, except for a first port designed for an inflow of temperature-control fluid into the interior space, and except for a second port designed for an outflow of temperature-control fluid out of the interior space.

As a result, it is possible to improve further, in particular, a limited transfer of heat in straightforward manner in the case of a design of a battery module with a temperature-control plate, by reason of the thermal resistance between the plurality of battery cells and the temperature-control plate.

Moreover, by virtue of an immediate flowing-around of the plurality of battery cells by the first temperature-control fluid, a fraction of a surface area of the plurality of battery cells that contributes immediately to a temperature control can be increased further in comparison with solutions having a temperature-control plate, since in the case of solutions with a temperature-control plate, in particular, exclusively a bottom of the plurality of battery cells is able to contribute to a temperature control.

As a result, in the case of an immediate flowing-around of the plurality of battery cells by the first temperature-control fluid, a direct or immediate temperature control can be formed, in which the transfer of heat between the plurality of battery cells and the first temperature-control fluid has been further increased and, in particular, has been maximized, since, for instance, the entire surface area of the plurality of battery cells can be used for a temperature control.

In particular, as a result it is possible to improve a temperature control of the plurality of battery cells further, and consequently to avoid high cell temperatures, in particular, for instance, in the course of rapid charging processes.

According to a preferred aspect of the invention, the second conveying unit takes the form of a turbine, an impeller or a blade wheel.

As a result, it is possible that the second conveying unit can take up kinetic energy, in straightforward manner and also in reliable manner, from the second temperature-control fluid which is flowing through the second temperature-control-fluid guide.

At this point, let it be noted that the second conveying unit preferably includes no actively driven drive unit such as a motor.

The kinetic energy taken up in this case is converted, in particular, into a rotational energy or rotational work.

According to a further preferred aspect of the invention, the first conveying element and the second conveying element are connected to one another in mechanically coupled manner.

In this case, the mechanically coupled connection may have been formed, for instance, by means of a mechanical shaft, by virtue of which, in particular, a simple transfer of the rotational work is also possible.

According to a further preferred aspect of the invention, the first conveying element and the second conveying element are connected to one another in magnetically coupled manner.

As a result, it is, for instance, advantageously possible to dispense with additional shaft seals.

At this point, let it be noted that the second conveying unit takes up kinetic energy from the second temperature-control fluid which, for instance, is flowing through the second temperature-control-fluid guide, and converts the kinetic energy taken up into rotational energy or rotational work.

Since the first conveying unit and the second conveying unit are connected to one another in coupled manner, in particular mechanically and/or magnetically, the rotational energy or rotational work can be transferred from the second conveying unit to the first conveying unit.

As a result, the first conveying unit can convey the first temperature-control fluid received in the first temperature-control-fluid guide, so that the first temperature-control fluid can flow through the first temperature-control-fluid guide.

Expressed in other words, this means, in particular, that a through-flow of the second temperature-control-fluid guide by the second temperature-control fluid gives rise to a through-flow of the first temperature-control-fluid guide by the first temperature-control fluid.

Consequently, the energy of flow, for instance, of the second temperature-control fluid in the second temperature-control-fluid guide forms, by reason of the coupling of the first conveying element and the second conveying element, a forced through-flow of the first temperature-control-fluid guide by the first temperature-control fluid.

Consequently, the first temperature-control fluid can be circulated, without an additional actively driven conveying element, such as a pump, being necessary in the first temperature-control-fluid guide.

In this case, the first conveying element may take the form of, for instance, an impeller or a blade wheel.

As a result, the first temperature-control fluid can be conveyed through the first temperature-control-fluid guide in straightforward manner.

It is particularly expedient if the first temperature-control-fluid guide and the second temperature-control-fluid guide are completely separated in fluid-conducting manner.

As a result, it is possible to form two flow regions designed to be completely separate from one another, without a mixing of the first temperature-control fluid with the second temperature-control fluid being possible.

Consequently, a temperature control of the battery module with the first temperature-control fluid can be formed which is designed to be independent of the second temperature-control fluid.

In particular in this case, the second temperature-control-fluid guide may have been connected in fluid-conducting manner to a temperature-control system of a vehicle, which, for instance, may include hoses, pumps or compressors.

In particular, as a result it is possible that, by virtue of a hermetic separation of the first temperature-control fluid and the second temperature-control fluid from one another, a standard temperature-control fluid specified by a vehicle manufacturer, for instance, can be guided in the first temperature-control-fluid guide.

For the sake of completeness, at this point let it also be noted that for a transfer of heat between the first temperature-control-fluid guide and the second temperature-control-fluid guide, and consequently also between the first temperature-control fluid and the second temperature-control fluid, any heat-exchanger units may be employed that separate the first temperature-control-fluid guide and the second temperature-control-fluid guide from one another in fluid-conducting manner.

For instance, such a heat-exchanger may have been formed in a plate-type design or in a double-tube design with spirally or rectilinearly formed transfer tubes. In particular, such a heat-exchanger unit should have been adapted to the available construction space.

On the whole, let it also be noted at this point that, for instance, for a cooling of the battery module the first temperature-control fluid flows through the first temperature-control-fluid guide and, by reason of the heat-conducting connection between the first temperature-control-fluid guide and the battery module, takes up heat from the plurality of battery cells, as a result of which the battery cells can be cooled.

By reason of the heat-conducting connection between the heat-exchanger unit and the first temperature-control-fluid guide and also the second temperature-control-fluid guide, the first temperature-control fluid can transfer the heat taken up to the second temperature-control fluid by means of the heat-exchanger unit, as a result of which the first temperature-control fluid can be cooled again.

In this case, the first temperature-control-fluid guide takes the form of a closed circuit.

Of course, the plurality of battery cells may also be heated up by means of the battery system.

For this purpose, the first temperature-control fluid flows through the first temperature-control-fluid guide and, by reason of the heat-conducting connection between the first temperature-control-fluid guide and the battery module, can emit heat to the plurality of battery cells, as a result of which the plurality of battery cells can be heated up. In this case, by reason of the heat-conducting connection between the heat-exchanger unit and the first temperature-control-fluid guide and also the second temperature-control-fluid guide, the first temperature-control fluid can take up heat from the second temperature-control fluid by means of the heat-exchanger unit, as a result of which the first temperature-control fluid can be heated up again.

In this case, the first temperature-control-fluid guide takes the form of a closed circuit.

On the whole in this case, both in the course of a cooling and in the course of a heating-up of the plurality of battery cells by means of the first temperature-control fluid, the flow of the first temperature-control fluid is caused solely by the energy of flow of the second temperature-control fluid.

Furthermore, the invention also relates to a vehicle that includes a battery system according to the invention as just described.

In this case, the at least one port of the second temperature-control-fluid guide is connected in fluid-conducting manner to a further temperature-control-fluid guide of the vehicle.

Moreover, the further temperature-control-fluid guide includes a further conveying element.

In this case, the further conveying element is designed to convey the second temperature-control fluid through the further temperature-control-fluid guide and the second temperature-control-fluid guide. In particular, the further conveying element in this case takes the form of an actively driven conveying element, such as a pump for instance.

In this case, by reason of the coupled connection of the first conveying element and the second conveying element to one another, the further conveying element can ensure a through-flow of the first temperature-control-fluid guide by the first temperature-control fluid, and consequently a reliable temperature control of the battery module.

Of course, in this point it is possible that the battery system of the vehicle can be developed further with all the advantageous further developments described in connection with the battery system according to the invention.

Also a subject of the present invention is a method for operating a battery system according to the invention.

In this connection, in a first method step a battery system according to the invention is provided.

In a second method step, a first temperature-control fluid is received in the first temperature-control-fluid guide.

In a third method step, the second temperature-control-fluid guide is flowed through by a second temperature-control fluid.

In the process, mechanical work is transferred from the second conveying element to the first conveying element.

In this case, by reason of the coupled connection of the first conveying element and the second conveying element to one another, the through-flow of the second temperature-control-fluid guide by the second temperature-control fluid can ensure a through-flow of the first temperature-control-fluid guide by the first temperature-control fluid, and consequently a reliable temperature control of the battery module.

The method is executed in such a way that the plurality of battery cells, which preferably take the form of lithium-ion battery cells or lithium-polymer battery cells, have a temperature below 35° C. For instance, at temperatures above 35° C. the flow velocity of the second temperature-control fluid can be increased, so that by means of the first temperature-control fluid an increased removal of heat is also possible.

BRIEF DESCRIPTION OF THE DRAWING

Embodiments of the invention are represented in the single drawing and elucidated in more detail in the following description.

Shown are:

FIG. 1 shows, schematically, an embodiment of a battery system according to the invention.

DETAILED DESCRIPTION

FIG. 1 shows schematically an embodiment of a battery system 1 according to the invention.

The battery system 1 may be, in particular, a battery system 1 of a vehicle 100 which is represented only schematically in FIG. 1.

The battery system 1 includes a battery module 2 which comprises a plurality of battery cells 3.

The plurality of battery cells 3 may take the form of, for instance, lithium-ion battery cells or lithium-polymer battery cells.

The battery system 1 exhibits a first temperature-control-fluid guide 4.

The first temperature-control-fluid guide 4 is designed to be capable of being flowed through by a first temperature-control fluid 5.

In particular, a first temperature-control fluid 5 is received in the first temperature-control-fluid guide 4.

The first temperature-control fluid 5 may take the form of a water/glycol mixture or a dielectric temperature-control fluid.

The first temperature-control-fluid guide 4 exhibits, moreover, a first conveying unit 6 which is designed to convey the first temperature-control fluid 5 through the first temperature-control-fluid guide 4.

The first conveying unit 6 may take the form of, for instance, an impeller or a blade wheel.

The first temperature-control-fluid guide 4 is, in addition, connected to the battery module 2 in heat-conducting manner.

FIG. 1 shows that the battery module 2 may include a temperature-control plate 14 connected to the plurality of battery cells 3 in heat-conducting manner.

Moreover, it is shown that the temperature-control plate 14 can be flowed through by the first temperature-control fluid 5.

FIG. 1 also shows that the battery module 2 may include an interior space 15, the plurality of battery cells 3 being accommodated in the interior space 15.

The interior space 15 is designed to be capable of being flowed through by the first temperature-control fluid 5.

In particular, the battery module 2 exhibits for this purpose a first port 151, designed for an admission of the first temperature-control fluid 5 into the interior space 15, and a second port 152, designed for a discharge of the first temperature-control fluid 5 out of the interior space 15. The plurality of battery cells 3 may preferably have been arranged so as to be capable of being flowed around immediately by the first temperature-control fluid 5.

Moreover, the battery system 1 exhibits a second temperature-control-fluid guide 7.

The second temperature-control-fluid guide 7 is designed to be capable of being flowed through by a second temperature-control fluid 8.

The second temperature-control-fluid guide 7 exhibits, moreover, a second conveying unit 9 which is designed to take up kinetic energy from the second temperature-control fluid 8.

The second conveying unit 9 may take the form of, for instance, a turbine, an impeller or a blade wheel.

In addition, the second temperature-control-fluid guide 7 includes a port 10 which is designed to be connected in fluid-conducting manner to a further temperature-control-fluid guide 11.

According to the embodiment of the battery system 1 shown in FIG. 1, the port 10 is connected in fluid-conducting manner to a further temperature-control-fluid guide 11 of a vehicle which cannot be discerned.

Moreover, the battery system 1 includes a heat-exchanger unit 12.

The heat-exchanger unit 12 is designed to transfer heat from the first temperature-control-fluid guide 4 to the second temperature-control-fluid guide 7.

Consequently, a temperature control of the battery module 2 by means of the second temperature-control fluid 8 is possible.

In addition, the first conveying element 6 and the second conveying element 9 are connected to one another in coupled manner by means of a coupling element 13.

In this case, mechanical work can be transferred from the second conveying element 9 to the first conveying element 6 by means of the coupling element 13.

The coupling element 13 may have been designed in such a way that a mechanically coupled connection of the first conveying element 6 and the second conveying element 9 to one another is formed, or that a magnetically coupled connection of the first conveying element 6 and the second conveying element 9 to one another is formed.

At this point, let it be noted once more that the first temperature-control-fluid guide 4 and the second temperature-control-fluid guide 7 are separated in fluid-conducting manner.

The battery system 1 may have been connected to the temperature-control system of a vehicle which cannot be discerned.

For this purpose, the battery system 1 exhibits the port 10 which, according to FIG. 1, is connected in fluid-conducting manner to the further temperature-control-fluid guide 11 of the vehicle.

The further temperature-control-fluid guide 11 exhibits a further conveying element 16 which may take the form of a pump, for instance.

The further conveying element 16 is designed to convey the second temperature-control fluid 8 through the second temperature-control-fluid guide 7 and the further temperature-control-fluid guide 11.

As a result, by reason of the mechanical or magnetic coupling of the first conveying element 6 and the second conveying element 9 by means of the coupling element 13, in particular the further conveying element 16 can ensure a through-flow of the first temperature-control-fluid guide 4 by the first temperature-control fluid 5, as a result of which the battery system 1 itself does not require an actively driven conveying element.

What is claimed is:

1. A battery system (1), with a battery module (2) comprising a plurality of battery cells (3),
   wherein the battery system (1) includes a first temperature-control-fluid guide (4) which is configured to be flowed through by a first temperature-control fluid (5) and includes a first conveying element (6) configured for propelling the first temperature-control fluid (5) through the first temperature-control-fluid guide (4),
   wherein the first temperature-control-fluid guide (4) is connected to the battery module (2) in heat-conducting manner, wherein the battery system (1) includes a second temperature-control-fluid guide (7) which is configured to be flowed through by a second temperature-control fluid (8), and includes a second conveying element (9) configured for uptake of kinetic energy from the second temperature-control fluid (8), wherein the second temperature-control-fluid guide (7) includes at least one port (10) configured for a fluid-conducting connection to a third temperature-control-fluid guide (11), and wherein the battery system (1) further includes a heat-exchanger unit (12) which is connected to the first temperature-control-fluid guide (4) and to the second temperature-control-fluid guide (7) in heat-conducting manner, and which is configured to transfer heat between the first temperature-control-fluid guide (4) and the second temperature-control-fluid guide (7), characterized in that the second conveying element (9) is coupled to the first conveying element (6) and is configured to transfer kinetic energy from the second temperature-control fluid (8) to the first conveying element (6), and the first conveying element (6) is configured to transfer kinetic energy from the second conveying element (9) to the first temperature-control fluid (4).

2. The battery system according to the preceding claim 1, characterized in that the first temperature-control fluid (5) is received in the first temperature-control-fluid guide (4), the first temperature-control fluid (5) taking the form of a water/glycol mixture or a dielectric temperature-control fluid.

3. The battery system according to claim 1, characterized in that the battery module (2) includes a temperature-control plate (14) connected to the plurality of battery cells (3) in heat-conducting manner, wherein
the temperature-control plate (14) is configured to be flowed through by the first temperature-control fluid (5).

4. The battery system according to claim 1, characterized in that the battery module (2) includes an interior space (15) in which the plurality of battery cells (3) are accommodated, wherein the interior space (15) is configured to be flowed through by the first temperature-control fluid (5).

5. The battery system according to claim 1, characterized in that the second conveying element (9) takes the form of a turbine, an impeller or a blade wheel.

6. The battery system according to claim 5, characterized in that the first conveying element (6) and the second conveying element (9) are connected to one another in mechanically coupled manner.

7. The battery system according to claim 1, characterized in that the first temperature-control-fluid guide (4) and the second temperature-control-fluid guide (7) are separated in fluid-conducting manner.

8. A vehicle (100) including a battery system (1) according to claim 1, wherein the at least one port (10) of the second temperature-control-fluid guide (7) is connected in fluid-conducting manner to the third temperature-control-fluid guide (11), wherein the third temperature-control-fluid guide (11) is part of the vehicle (100), characterized in that the third temperature-control-fluid guide (11) includes a third conveying element (16) which is configured for propelling of the second temperature-control fluid (8) through the third temperature-control-fluid guide (11) and the second temperature-control-fluid guide (7).

9. A method for operating a battery system (1) according to claim 1, characterized in that
in a first method step, the battery system (1) is provided,
in a second method step, the first temperature-control fluid (5) is received in the first temperature-control-fluid guide (4), and
in a third method step, the second temperature-control-fluid guide (7) is flowed through by a second temperature-control fluid (8), whereby mechanical work is transferred from the second conveying element (9) to the first conveying element (6).

10. The battery system according to claim 1, wherein the battery system is in a vehicle, and wherein the battery cells (3) are lithium-ion battery cells.

11. The battery system according to claim 1, wherein the battery system is in a vehicle, and wherein the battery cells (3) are lithium-polymer battery cells.

12. The battery system according to claim 1, characterized in that the battery module (2) includes an interior space (15) in which the plurality of battery cells (3) are accommodated, wherein the interior space (15) is configured to be flowed through by the first temperature-control fluid (5), and wherein the plurality of battery cells (3) are configured to be flowed around immediately by the first temperature-control fluid (5).

13. The battery system according to claim 6, characterized in that the first conveying element (6) and the second conveying element (9) are also connected to one another in magnetically coupled manner.

14. The battery system according to claim 5, characterized in that the first conveying element (6) and the second conveying element (9) are connected to one another in magnetically coupled manner.

15. The battery system according to claim 1, characterized in that the first conveying element (6) takes the form of an impeller or a blade wheel.

* * * * *